(12) United States Patent
Wang (10) Patent No.: US 7,704,422 B2
(45) Date of Patent: Apr. 27, 2010

(54) PROCESS FOR PRODUCING MONOLITHIC POROUS CARBON DISKS FROM AROMATIC ORGANIC PRECURSORS

(75) Inventor: Jing Wang, Amherst, MA (US)

(73) Assignee: ElectroMaterials, Inc., Amherst, MA (US)

( * ) Notice: Subject to any disclaimer, the term of this patent is extended or adjusted under 35 U.S.C. 154(b) by 1302 days.

(21) Appl. No.: 10/919,450

(22) Filed: Aug. 16, 2004

(65) Prior Publication Data

US 2006/0033225 A1 Feb. 16, 2006

(51) Int. Cl.
*C01B 31/00* (2006.01)
(52) U.S. Cl. .................................................... 264/29.6
(58) Field of Classification Search ................. 264/29.6
See application file for complete search history.

(56) References Cited

U.S. PATENT DOCUMENTS

| | | | |
|---|---|---|---|
| 4,755,428 A * | 7/1988 | Noda et al. | 428/402 |
| 5,231,162 A | 7/1993 | Nagata | |
| 5,360,669 A * | 11/1994 | Noland et al. | 428/408 |
| 6,025,020 A | 2/2000 | Chen et al. | |
| 6,315,971 B1 | 11/2001 | Wallace et al. | |
| 6,544,648 B1 * | 4/2003 | Nesbitt et al. | 428/408 |
| 2005/0131163 A1 * | 6/2005 | Rhine et al. | 525/420 |

* cited by examiner

*Primary Examiner*—Carlos Lopez
*Assistant Examiner*—Russell J Kemmerle, III
(74) *Attorney, Agent, or Firm*—Jackson Walker L.L.P.

(57) ABSTRACT

Disclosed are processes for producing monolithic and metal doped monolithic porous carbon disks from prepolymer organic precursors in the powder form composed of either or both polyimide and polybenzimidazole. The powders are consolidated (compressed) into disks and then pyrolyzed to form the desired porous carbon disk.

23 Claims, 2 Drawing Sheets

PROCESS FOR PRODUCING MONOLITHIC POROUS CARBON DISKS FROM AROMATIC ORGANIC PRECURSORS

BACKGROUND OF THE INVENTION

1. Field of the Invention

The present invention relates to the preparation of prepolymers composed of either or both of polyimide and polybenzimidazole as organic precursors for producing monolithic porous carbon disks with density less than or equal to 1.0 g/cc; and the processes for producing monolithic porous carbon disks from either or both of polyimide and polybenzimidazole procurers in the form of powders. The present invention further relates to the processes for producing monolithic porous carbon disks derived from either or both of polyimide and polybenzimidazole precursors having one or more than one metals dispersed therein. The present invention even further relates to the processes for producing monolithic porous carbon disks derived from either or both of polyimide and polybenzimidazole precursors such that the carbon disks having pyridine-like structure wherein the transition metal atoms are caged in or complex with.

2. Description of Related Art

Monolithic porous carbon disks, which possess interpenetrating pore structure, high density, high surface area, suitable pore size, and well defined pore size distribution, are highly desirable as electrode materials for lithium batteries, electrochemical capacitors, fuel cells, as well as other electrochemical devices.

One approach to produce monolithic porous carbon disk is through sol-gel technologies. The sol-gel technology generally consists of preparation of gels from solution, drying the gel while minimizing the gel shrinkage. The pyrolysis of thin gel films yields porous monolithic carbon disks. RF carbon aerogel currently in the market as electrode material for supercapacitors is derived from resorcinol and formaldehyde organic precursors. RF carbon aerogel provide high surface area and narrow pore size distribution. Yet, the potential market of RF carbon aerogel as electrode material for ultracapacitors is severely limited by the low operating voltage of the capacitor ($<=5V$) and high manufacturing cost of monolithic RF carbon aerogel materials.

Another approach to produce monolithic porous carbon disks is from powders of porous polymeric precursors by compressing them into monolithic disks followed by pyrolysis. There are two (2) obstacles in this approach. One is the compressibility of the polymer precursor and other is the difficulty in retaining interpenetrating network of the pores during the compression process. U.S. Pat. No. 6,544,648 discloses a process for making monolithic carbon disks by compressing carbon black powder with high surface area under vacuum environment at temperatures at or beyond 800° C. and a pressure at or beyond 3000 psi. This approach produces carbon disks with more undesirable micro-pores with pore diameter less than 2 nm than the ones by sol-gel approach. The compression of carbon powder under vacuum at 800° C. displays sever technical challenges and high manufacturing costs.

Bearing in mind the problems and deficiencies of the prior art, it is therefore an object of the present invention to provide monolithic porous carbon disks with high surface area, high pore volume, high surface activity, well defined pore structure and morphology, and good mechanical properties. It would also be desirable to provide a process for producing such monolithic porous carbon disks with significantly lower cost as compared to the processes currently in the market.

Still other objects and advantages of the invention will in part be obvious and will in part be apparent from the specification.

SUMMARY OF THE INVENTION

The present invention provides processes for producing monolithic porous carbon disks from a group of aromatic organic precursors comprising the steps of: (1) preparation of prepolymers in the forms of porous powder; (2) consolidation of the powders into disks; and (3) pyrolysis producing monolithic porous carbon disks.

The present invention further provides processes for producing monolithic porous carbon disks doped with transition metals from a group of aromatic organic precursors and metallic compounds comprising the steps of: (1) preparation of prepolymers in-situ, doped with metallic compounds, in the forms of porous powder; (2) consolidation of the powders into disks; (3) pyrolysis producing monolithic porous carbon disks.

The prepolymers as the aromatic organic precursors of this invention have nitrogen-containing heterocyclic structures that connect monomer units into rod-like molecular chain structures with few flexible links or hinges. The chain architecture of prepolymers comprises of either linear chains, or a three dimensional network, or hyberbranched chain structure. One group of the prepolymers are composed of polyimide with imide group in the molecular structure. Another group of the prepolymers are composed of polybenzimidazole with benzimidazole group in the molecular structure. Yet, another group of the prepolymers are composed of both polyimide and polybenzimidazole with both imide and benzimidazole groups in the molecular structure.

The monolithic porous carbon disks produced from this invention can be further reinforced by fibers or fiber pads or other additives by incorporating fibers, inorganic particles, fiber pads, or other additives during the compression molding (consolidation) process.

The prepolymers prepared form the aromatic organic monomers of this invention may comprise other components, such as polysiloxane or silica, but have the aromatic organic composition preferably greater than or equal to about 70% by weight.

The polyimide and polybenzimidazole may be represented by the formulas:

Polyimide

-continued

Polybenzimidazole wherein A1 and A4
represent difunctional phenyl, difunctional biphenyl, an optionally substituted difunctional aryl, optionally substituted difunctional alkylene, an optionally substituted difunctional heteroaryl, or a combination thereof;
wherein A2 and A5
represents phenyl, biphenyl, an optionally substituted aryl group, or an optionally substituted heteroaryl group;
wherein A3
represent multifunctional phenyl with functionality more than or equal to 2, multifunctional biphenyl with functionality more than or equal to 2, an optionally substituted multifunctional aryl with functionality more than or equal to 2, optionally substituted multifunctional alkylene with functionality more than or equal to 2, an optionally substituted multifunctional heteroaryl with functionality more than or equal to 2, or a combination thereof;

n1, n2 and n3 are greater or equal to 1; and (y+2) are more than or equal to 2.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

Figure 1:
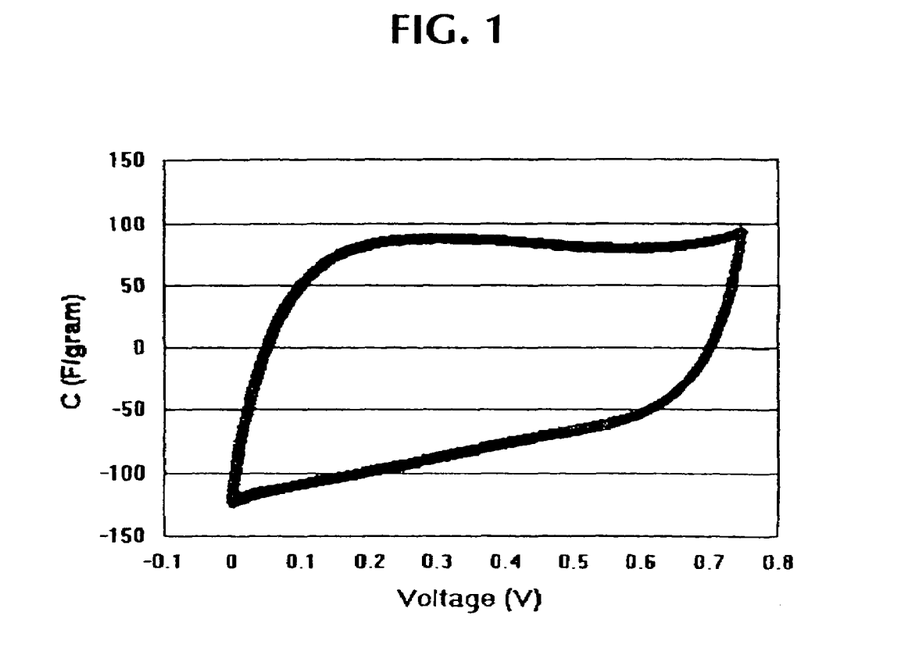
FIG. 1 is a cyclic voltammetry (CV) graph of Example 1 showing C (F/gram) versus Voltage at a scan rate of 5 mV/sec.
Figure 2:
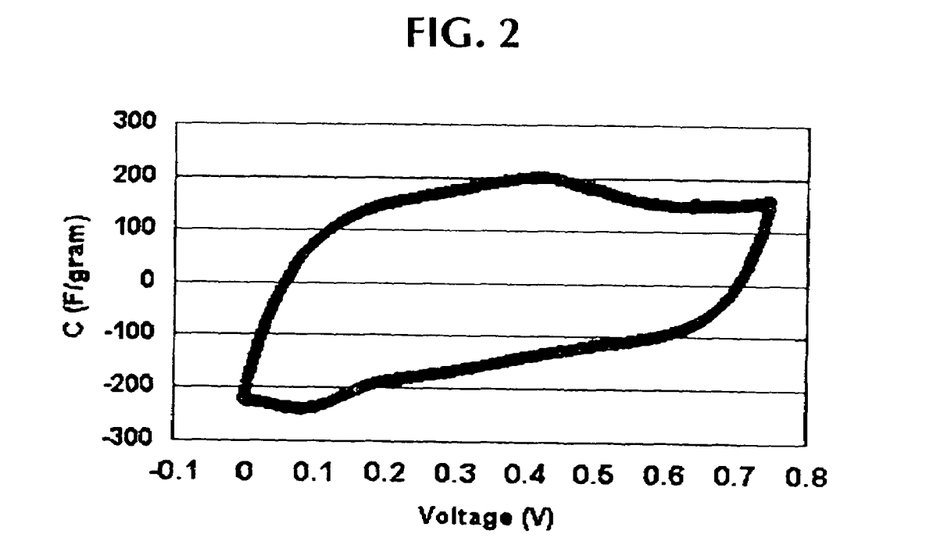
FIG. 2 is a cyclic voltammetry (CV) graph of Example 2 showing C (F/gram) versus Voltage at a scan rate of 5 mV/sec.
Figure 3:
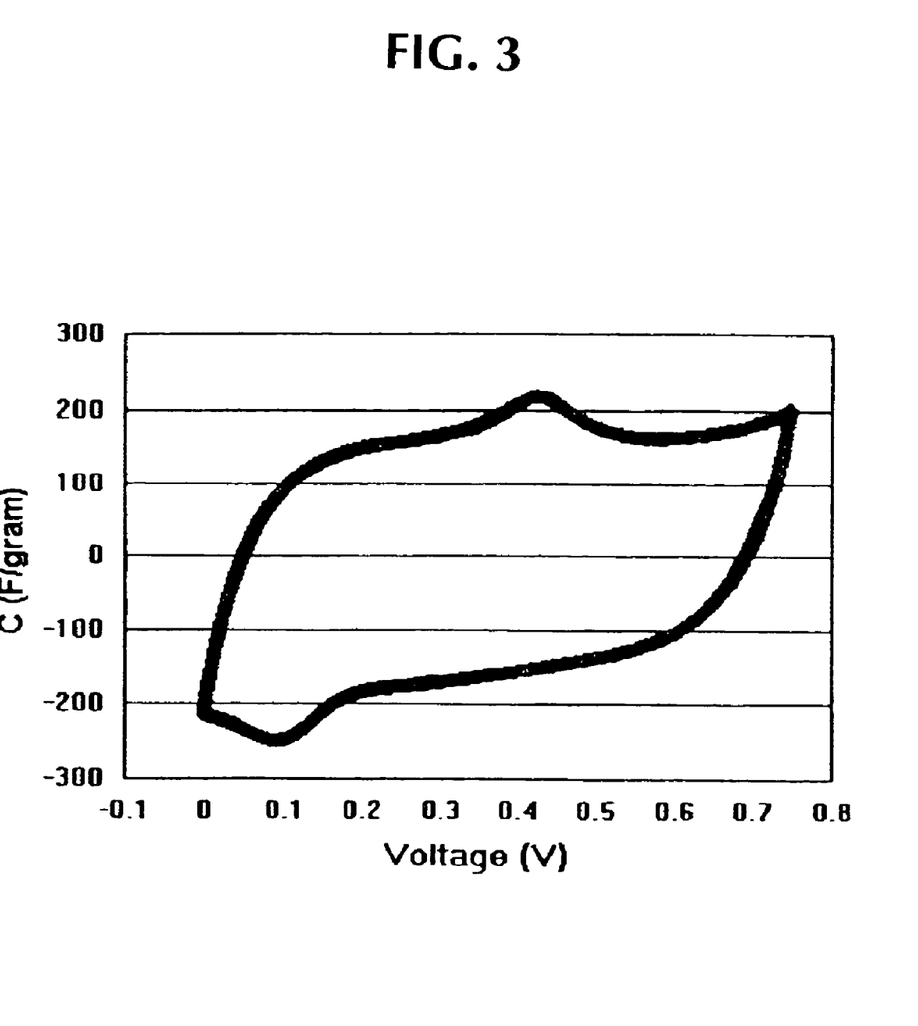
FIG. 3 is a cyclic voltammetry (CV) is a graph of Example 3 showing C (F/gram) versus Voltage at a scan rate of 5 m V/sec.

In describing the preferred embodiment of the present invention, reference will be made herein to FIGS. 1-3 of the drawings in which like numerals refer to like features of the invention.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

In the present invention, the aromatic organic monomers for preparing polyimide prepolymers are preferably selected from one of the following groups: aromatic dianhydride, aromatic diamine, and as an option, an aromatic polyamine compounds with amine functionality beyond 2; or aromatic tetracarboxylic acids, aromatic diamine, and as an option, an aromatic polyamine compounds with amine functionality beyond 2; or ester(s) of aromatic tetracarboxylic acids, aromatic diamine, and as an option, an aromatic polyamine compounds with amine functionality beyond 2; or aromatic dianhydride, aromatic isocyanates including diisocyanate and polyisocyanate with functionality beyond 2.

In the present invention, the aromatic organic monomers for preparing polybenzimidazole prepolymers are preferably selected from one of the following monomer groups: aromatic dialdehydes and aromatic tetraamines; or diester of aromatic dicarboxylic acids and aromatic tetraamines; or aromatic dicarboxylic acids and aromatic tetraamines.

The prepolymers comprising either or both polyimide and polybenzimidazole can be synthesized from monomers either in the presence of a solvent or in the melt state by the following procedures:

Procedure 1

Admixing all the ingredients in the presence of a solvent. The solvent is removed by distillation, assisted by vacuum if it is necessary to form a homogeneous mixture in the powder form. Further chemical reactions to produce un-fusible and un-meltable high molecular weight polymeric materials proceed after compression molding of the powders into a disk.

Procedure 2

Carrying out the condensation reaction of the aromatic monomers in a solution to produce prepolymers in the forms of either a precipitated powder or gels. The solvent in the prepolymers is removed by distillation, assisted by vacuum if it is necessary. The prepolymers are further ground into fine powder or porous particles, filtered through a sieve if it is necessary.

Procedure 3

Heating the aromatic organic precursors into the melted state with stirring to form prepolymers in the solid form. Sometimes, evaporation of byproducts, such as a low molecular weight alcohol or water, produces foams instead of dense solid. The prepolymer is further ground into fine powder or porous particles, filtered through a sieve if it is necessary.

The polyimide prepolymers are preferably condensation products of aromatic diamines and aromatic tetracarboxylic dianhydride, or aromatic diamines and tetracarboxylic acids, or aromatic diamines and ester(s) of tetracarboxylic acids, or aromatic isocyanates and aromatic tetracarboxylic dianhydride. As an option, a small amount of polyamine compounds with amine functionality greater than two takes place some of the aromatic diamine to introduce chemical cross-links to the polyimide prepolymers. Therefore, polyimide prepolymers may possesses linear molecular structure, or a hyper-branched molecular structure, or a three-dimensional network molecular structure. The synthesis of polyimide prepolymers generally proceeds in the synthesis of poly(amic acids) and then imidization to form polyimide.

Using the monomers of aromatic amines including diamines and polyamine compounds and acids or ester(s) of tetracarboxylic acids the synthesis of polyimide prepolymers can be carried out according to any of Procedures 1 to 3. In Procedure 1, the monomers and other additives are dissolved in a solvent to form a clear solution. The prepolymers in the form of fine powders are either a homogeneous mixture of monomers or a mixture of low molecular weight oligomers of polyimide and poly(amic acids). In Procedure 2, the monomers and other additives are dissolved in a aprotic organic solvent. The reaction is carried out with a normal agitation at or above 100° C., preferably at or above 150° C. The polyimide prepolymers are in the forms of either precipitated powder or gels. The solvent is removed from the product by distillation, assisted by vacuum if it is necessary. In Procedure 3, preferably, the esters of tetracarboxylic acids and aromatic amines are the monomers of choice. The condensation reaction at the molten state of the monomers releases phenol or an alcohol molecule in the gas phase to produce rigid foams of polyimide. The product is further ground to produce polyimide powder.

Using the monomers of aromatic dianhydride and aromatic amines including diamines and polyamines the synthesis of polyimide prepolymers is carried out according to Procedure 2 in two steps: synthesis of poly(amic acids) and imidization to form polyimide. The synthesis of poly(amic acids) is conducted by dissolving monomers and other additives in an organic solvent at ambient temperature with a normal agitation for a time period from several hours to overnight to yield product in the forms of either precipitated powder or viscous liquid solution or gels. In the cases of poly(amic acids) in the form of precipitated powder, the solvent is removed by distillation followed by a thermal imidization of poly(amic acids) powder typically at a temperature in the range of 50° C. to 500° C., preferably in the range of 100° C. to 450° C. and preferably under protection of an inert gas, such as nitrogen or argon. In the cases of poly(amic acids) in the form of viscous liquid solution or gels the imidization may be carried out either by chemical imidization at ambient temperature or thermal imidization at elevated temperatures. The chemical imidization may be conducted by addition of dehydrating agents to the poly(amic acids) to produce polyimide gels. The thermal imidization of poly(amic acids) may be conducted at elevated temperatures typically in the range of 50° C. to 500° C., preferably in the range of 100° C. to 450° C. to produce polyimide in the form of either precipitated powder or gels. The solvent is removed by distillation, assisted by vacuum if it is necessary.

Using aromatic dianhydride and aromatic isocyanate including diisocyanate and polyisocyanate as the organic precursor, the synthesis of polyimide prepolymers is preferably carried out according to Procedure 1. In this procedure, the monomers and additives are admixed at ambient temperature in the presence of a dipolar aprotic organic solvent. The solvent removal produces a homogeneous mixture in the powder form.

Although not exclusive to the other synthesis procedures, preferably, polyimide prepolymers are prepared from aromatic monomers of tetracarboxylic dianhydride, aromatic diamine, and optionally, a polyamine compound according to Procedure 2 using thermal imidization method. In this procedure, the reaction of monomers and other additives are conducted in an aprotic solvent, such as dimethylacetamide (DMAc), at ambient temperature with agitation for a period of time. Temperature of the reaction system is then raised typically to the range of 130° C. to 200° C., preferably in the range of 150° C. to 180° C. to produce polyimide as precipitate. The solvent is distilled off to produce the dried polyimide prepolymer powder.

The polybenzimidazole prepolymers are condensation products of aromatic tetraamines and aromatic esters of dicarboxylic acids, or aromatic tetraamines and aromatic dialdehyde. The synthesis proceeds either in the molten state of monomers or in the presence of a solvent.

Using aromatic tetraamine and aromatic dialdehyde as aromatic monomers the synthesis of polybenzimidazole is carried out according to Procedure 2 in two-stages: synthesis of poly(azomethines) as intermediate product in the presence of an organic solvent and synthesis of poly(benzimidazole). In this procedure, the reaction of the monomers in an organic solvent is carried out typically at temperatures in the range of −30° C. and ambient temperature to produce poly(azomethines) in the forms of either precipitated powder or viscous liquid solution. Further reaction at a elevated temperature typically in the range of 50° C. to 350° C., more preferably in the range of 100° C. to 250° C., converts poly(azomethines) to polybenzimidazole. The solvent is removed from the system when the product is precipitated from the solution either before or after second stage reaction at elevated temperatures.

Using the monomers of aromatic tetraamine and esters of dicarboxylic acids the synthesis of polybenzimidazole proceeds preferably according to Procedure 3 in the molten state of the monomers although not exclusive to the synthesis in the presence of a solvent. The reactions are conducted at or above melting temperatures of the monomers with strong agitation and in such conditions that side products of phenol, or water, or an alcohol in the gas phase are released from the system to produce the product in foams. The products are crushed and further ground to produce polybenzimidazole prepolymers in the form of porous powder.

The prepolymers composed of both polyimide and polybenzimidazole segments in the molecular structure can be prepared preferably in the presence of an organic solvent. The synthesis can be conducted by either synthesizing one prepolymer of either polyimide or polybenzimidazole before adding the monomers for the other prepolymer to the reaction system. Or the reactions of polyimide and polybenzimidazole are carried out separately before combining two reactions into one reaction system. Or two sets of the monomers are mixed together simultaneously in the same reaction solution when the reaction conditions are compatible. Yet, such mixing would be prohibited if a relatively large amount of flexible amide links is introduced to the molecular chain structure so as to reduce the glass transition temperature of the material significantly.

An alternate approach to prepare monolithic porous carbon disks from prepolymers comprising both polyimide and polybenzimidazole is mixing powders of both polyimide and polybenzimidazole prepolymers together during the process of consolidating powders into disks.

As an option, the prepolymer powders comprising either or both of polyimide or polybenzimidazole are further broken down to smaller particle size by a shear stress and filtered through a sieve if it is necessary. The preferred particle size of prepolymers for the purpose of compression molding is typically in the range of 1 μm to 300 μm, more preferably in the range of 5 μm to 75 μm, and even more preferably in the range of 10 μm to 50 μm.

As another option, the prepolymer powders comprising of either or both polyimide and polybenzimidazole in the powder form can be further thermally annealed at elevated temperatures before consolidating into a disk. The annealing is typically conducted in a temperature range of 50° C. to 600° C., more preferably in the range of 50° C. to 500° C. usually for a time period between 20 minutes to 2 hours under vacuum or under protection of argon or nitrogen atmosphere.

The present invention further provides processes for in-situ doping transition metallic compound to the prepolymers comprising either or both polyimide and polybenzimidazole for preparing monolithic carbon disks. In a general procedure, a transition metallic compound either in the solid form or in solution is added to the reaction system or to the dried prepolymer powder or to the dried prepolymer disk. In the cases of a solution the solvent used for dissolving the transition metallic compound is preferably the same solvent as the one for preparing the prepolymers. Although not exclusive to the addition of the metallic compounds at any stage or any step during the preparation of monolithic disks including each synthesis step of the condensation reaction and the consolidation process, preferably, the transition metallic compounds are added during the early stages of the procedures. Even more preferably the solvent used for dissolving the transition metallic compound is the same solvent as for preparing the prepolymer. Even more preferably, the transition metallic compounds are admixed with the organic precursors in the presence of an organic solvent before proceeding with the synthesis of the prepolymers.

The solvent removal during the synthesis of the prepolymers comprising either or both of polyimide and polybenzimidazole are conducted by distillation, preferably assisted by vacuum.

The present invention even further provides processes for producing monolithic carbon disks from dried porous powders of the prepolymers comprising of either or both polyimide and polybenzimidazole comprising: consolidation of the porous prepolymer powders into a monolithic disk at ambient temperature under a pressure typically in the range of 3000 psi to 13000 psi, more preferably in the range 3500 psi to 8000 psi, and even more preferably in the range of 3500 psi to 6000 psi and pyrolysis under protection an inert atmosphere for producing monolithic porous carbon disk.

The present invention even further provides processes for producing monolithic porous carbon disks having one or more metals dispersed therein from the prepolymer powders of either or both polyimide and polybenzimidazole comprising: in-situ incorporating metallic compounds with the prepolymers by adding the metallic compound to the reaction system during or after any step of the prepolymer preparation, consolidation of the porous prepolymer powders into monolithic disks at ambient temperature under a pressure typically in the range of 3000 psi to 13000 psi, more preferably in the range 3500 psi to 8000 psi, even more preferably in the range of 3500 psi to 6000 psi and pyrolysis under an inert atmosphere for producing monolithic porous carbon disks.

In a general consolidating procedure, the prepolymer powders are evenly placed in a mold or on a supporting substrate, such as a fiber pad, before a sufficiently high compression pressure and a sufficient holding time are applied to produce a monolithic disk with an rod density in the range of 0.4 gram/cc to 1.0 gram/cc, more preferably in the range of 0.6 gram/cc to 0.95 gram/cc.

Before the consolidation procedure, other additives or reinforcements in the solid forms may be mixed or assembled with the prepolymer powders. Typically preferred reinforcement agents include woven or non-woven fiber pads of graphite fibers, of carbon fiber precursors, of metal fibers, or of a mixture thereof, carbon cloth, sub-micron beads of polymeric materials, microcrystalline inorganic and organic compounds, carbon nanotubes, metallic fillers or particles, silica powder, as well as other materials in the form of powder, fiber, pads, or cloth.

The pyrolysis of compressed disks is carried out under protection of for example an inert gas atmosphere, such as argon or nitrogen, at a temperature typically in the range of 750° C. to 1500° C., usually for 1 hour to 10 hours, preferably 2-5 hours. As an option, the inert gas may be changed during the pyrolysis (preferably in the later stage) to carbon dioxide to further activate the pore surface of the monolithic carbon disk. The heating rate shall be sufficiently slow as to optimize the properties of monolithic carbon disks.

Metals suitable for use in the preparation of metal doped monolithic porous carbon disks of this invention are not limited and may include elemental metals, organometallic compounds, coordination inorganic compounds, metal salts or any combinations thereof. The preferred metals include Ti, Zr, V, Nb, Cr, Mo, Mn, Fe, Ru, Co, Rh, Ni, Pd, Pt, Cu, Ag, Zn, Si, Sn, Pb, Sb, Nb, Bi, Hf, Ba, Al, B, P As and combinations thereof. Exemplary transition metal compounds include cobalt chloride ($CoCl_2$), iron chloride ($FeCl_3$), nickel chloride ($NiCl_2$), molybdenum chloride ($MoCl_5$), hydrogen hexachloroplatinate hydrate ($H_2PtCl_6*xH_2O$), copper chloride ($CuCl_2$), tungsten chloride ($WCl_6$), zirconium chloride ($ZrCl_4$), cerium nitrate ($Ce(NO_3)_3$), ruthenium chloride ($RuCl_3$) and hafnium chloride ($HfCl_4$).

Typically, the transition metallic compound is present in the prepolymer in an amount from 0.01% to 20% by weight, or more.

In a first aspect, the present invention provides processes for producing porous monolithic disks of prepolymer comprising either or both of polyimide and polybenzimidazole as organic precursors for producing monolithic porous carbon disks which have surface area at or above about 500 $m^2$/gram, sufficiently high mechanical strength, and macrocyclic pyridine structure with increased catalytic activities.

In another aspect, the present invention provides processes for producing porous monolithic disks of transition metal doped prepolymers comprising either or both polyimide and polybenzimidazole as organic precursors for producing transition metal doped monolithic porous carbon disks which have surface area at or above about 500 $m^2$/gram, sufficiently high mechanical strength, and macrocyclic pyridine structure wherein the transition metal atoms caged or complexed into to provide catalytic activities.

In a further aspect, the present invention provides processes for producing monolithic porous carbon disks with a rod density of less than or equal to about 1.0 gram/cc from porous powders of prepolymers comprising either or both polyimide and polybenzimidazole comprising: consolidating the prepolymer powders into a monolithic disk under pressure conditions as to produce a homogeneous composition with desired rod density; and pyrolysis under protection of argon or nitrogen to produce a monolithic porous carbon disk.

In a even more further aspect, the present invention provides processes for producing transition metal doped monolithic porous carbon disks with a rod density of less than or equal to about 1.0 gram/cc from porous powders of transition metal doped prepolymers comprising either or both polyimide and polybenzimidazole comprising: consolidating the transition metal doped prepolymer powders into a monolithic disk under pressure conditions as to produce a homogeneous composition with desired rod density; and pyrolysis under protection of argon or nitrogen to produce a monolithic porous carbon disk.

Preferred aromatic tetracarboxylic dianhydride, or tetracarboxylic acids, or diester(s) of tetracarboxylic acids monomers suitable for use in the methods of making polyimide prepolymers of the present invention include pyromellitic dianhydride, pyromellitic tetracarboxylic acids and dialkyl ester(s) of pyromellitic tetracarboxylic acids, 3,3',4,4'-biphenyl tetracarboxylic acids, 3,3',4,4'-benzophenone tetracarboxylic acids, 2,3,6,7-naphthylene tetracarboxylic acids, 1,4,5,8-napthalene tetracarboxylic acids, 2,2-bis(3,4-dicarboxyl phenyl)propane acids and combinations thereof.

Preferred aromatic diamine monomers suitable for use in the methods of making polyimide prepolymers of the present invention include 1,4-phenylene diamine, m-phenylene diamine, 4,4'diamino-biphenyl, 4,4'-diaminodiphenyl-methane, 3,3'-diaminodiphenylmethane, 4,4'-diaminobenzophenone, 3,3'-diaminobenzophenone, benzidine, 2,6-diaminopyridine, 2,6-diaminonaphthalene and derivatives thereof (i.e.: substituted diamine having a substituent(s)). The above diamine monomers may be used alone or as a mixture of two or more of them.

Preferred polyamine compounds with amine functionality greater than 2 suitable for use in the methods of making polyimide prepolymers comprising a three-dimensional molecular structure of the present invention include 3,3'4,4'-biphenyltetraamine (TAB), 1,2,4,5-benzenetetraamine, 3,3'4,4'-tetraaminodiphenyl ether, 3,3'4,4'-tetraaminodiphenylmethane, 3,3',4,4'-tetraaminobenzophenone, 3,3',4-triaminodiphenyl, 3,3',4-triaminodiphenylmethane, 3,3',4-triaminobenzophenone, 1,2,4-triaminobenzene, their mono-, di-, tri-, or tetra-acid salts, such as 3,3'4,4'-biphenyltetraamine tetrahydrochloride, 1,2,4,5-benzenetetraamine tetrahydrochloride, 3,3'4,4'-tetraaminodiphenyl ether tetrahydrochloride, 3,3'4,4'-tetraaminodiphenylmethane tetrahydrochloride, 3,3',4,4'-tetraaminobenzophenone tetrahydrochloride, 3,3',4-triaminodiphenyl trihydrochloride, 3,3',4-triaminodiphenylmethane trihydrochloride, 3,3',4-triaminobenzophenone trihydrochloride, 1,2,4-triaminobenzene trihydrochloride, melamine, 2,4,6-triaminopyrimidine (TAP), The acid salts of the above compounds usually exist in the form of hydrated compounds. Any of the above compounds may be used either alone or as a mixture of two or more of them.

Preferred polyamine compounds with amine functionality greater than 2 suitable for use in the methods of making polyimide prepolymers comprising a three-dimensional molecular structure of the present invention also include a polyamine oligomer with the formula:

$1 \le n;$

The polyamine oligomer is typically a polyaddition reaction product from formaldehyde and a difunctional amino and nitro aromatic compound wherein the nitro group is reduced to an amino group.

Preferred aromatic isocyanate monomers suitable for use in the methods of making polyimide prepolymers of the present invention include 1,3-phenylene diisocyanate, 1,4-phenylene diisocyanate and 4,4'-diphenylmethane diisocyanate.

Any of the above compounds may be used either alone or as a mixture of two or more of them.

Preferred aromatic dialdehyde monomers suitable for use in the methods of making polybenzimidazole prepolymers of the present invention include isophthalaldehyde, terephthaldicarboxaldehyde, phthalic dicarboxaldehyde, and 2,6-naphthalenedicarboxaldehyde.

Preferred monomers of aromatic acids and esters of dicarboxylic acids suitable for use in the methods of making polybenzimidazole prepolymers of the present invention include acids and esters of isophthalic acid, phthalic acid, terephthalic acid, 1,4-naphthalenedicarboxylic acid, and 2,6-naphthalenedicarboxylic acid. The ester(s) may be alkyl or phenyl esters. When ester(s) are alkyl esters the alkyl group preferably contains 1 to 5 carbon atoms and is more preferably methyl.

Preferred monomers of aromatic tetraamines suitable for use in the methods of making polybenzimidazole prepolymers of the present invention include 3,3',4,4'-tetraaminobiphenyl(3,3'-diaminobenzidine); 1,2,4,5-tetraaminobenzene; 1,2,5,6-tetraaminonaphthalene; 2,3,6,7-tetraaminonaphthalene; 3,3',4,4'-tetraaminodiphenyl methane; 3,3',4,4'-tetraaminodiphenyl ethane; 3,3',4,4'-tetraaminodiphenyl-2,2-propane; and combinations thereof.

Preferred reaction solvents for polyimide synthesis include N-methyl-2-pyrrolidinone (NMP), N,N-dimethylacetamide (DMAc), N,N-dimethyl formamide (DMF), tetrahydrofuran (THF), and mixtures thereof.

Preferred reaction solvents for poly(amic acids) synthesis which yields poly(amic acids) as a precipitated product include acetone, methanol, and tetrahydrofuran (THF).

Preferred reaction solvents for polybenzimidazole synthesis include N-methyl-2-pyrrolidinone (NMP), N,N-dimethylacetamide (DMAc), N,N-dimethyl formamide (DMF), tetrahydrofuran (THF), and mixtures thereof.

The chemical imidization is preferably conducted by addition of a dehydrating solution to the poly(amic acids) at ambient temperature. The dehydrating solution consists of either an acid anhydride or a mixture of an acid anhydride and an organic base in an organic solvent. The organic solvent is preferably to be the same solvent that is used for the synthesis of poly(amic acids). The concentration of the acid anhydride is preferably in the range of 1 to 50%, by weight, more preferably in the range of 10 to 30%, by weight.

Preferred acid anhydrides include acetic anhydride, propionic anhydride, n-butyric anhydride, benzoic anhydride, and trifluoroacetic anhydride. Preferred organic bases include optionally substituted mono-, di-, and trialkylamines, optionally substituted pyridines.

The polyimide prepolymers suitable for use in the methods of making monolithic porous carbon disks of the present invention also comprise polyimide which is copolymerized with another material, such as polyimide-imidazopyrrolone, polyimide-siloxane, polyimide-silica, polyimide-epoxy, polyimide-bismaleimides, and polyimide-polybenzimidazole. The composition of polyimide in copolyimide powders of this invention is greater than or equal to 70% composition, by weight.

The preparation of polyimide prepolymer may also be made from aromatic tetracarboxylic dianhydride and aromatic amines in the presence of an organic solvent and then chemical imidization by addition of dehydrating agents to produce polyimide gels followed by breaking the gel particles to desired small sizes and removing the solvent trapped within the gel to produce fine polyimide powder. The dehydrating agents is either an acid anhydride or a mixture of an acid anhydride and an organic base. The acid anhydride is usually selected from acetic anhydride, propionic anhydride, n-butyric anhydride, benzoic anhydride, and trifluoroacetic anhydride and the organic base is selected from pyridine, rimethylamine, triethylamine, and optionally substituted mono-, di-, and trialkylamines.

The monolithic carbon disks of this invention are suitable for use as an electrode material in electrochemical capacitors and related electrochemical devices. The porous monolithic carbon disks of the invention offer the advantage of a monolithic structure, high density, high surface area, and narrow pore size distribution.

EXAMPLES

Example 1

Synthesis of Polyimide Prepolymer with Three-Dimensional Molecular Structure and Carbon Disk Therefrom Starting monomers: 3,3'4,4'-biphenyltetraamine (TAB), 1,2,4,5-benzenetetracarboxylic dianhydride (PMDA), and 1,4-phenylenediamine (PPD).

Solvent: N,N-dimethylacetamide (DMAc).

1.30 gram (0.012 mole) PPD was dissolved in 40 ml DMAc in a flask. While stirring, 3.270 gram (0.015 mole) PMDA in the solid form was added to the reaction system. After PMDA was fully dissolved, 0.3215 gram (0.0015 mole) TAB was added to the reaction system. The reaction was carried out at ambient temperature with mechanical stirring until a very viscous solution, often gel lumps, was formed. The temperature of the reaction was gradually raised to 150° C. with strong agitation to produce polyimide in precipitated powder form. The solvent was distilled off under vacuum at 50° C. The powders were further broken down and filtered through a 50 micron-sized sieve.

By using a hydraulic press, the polyimide powder was placed in a mold and compressed under pressure of 5000 psi at ambient temperature to produce a monolithic disk. The monolithic disk was pyrolyzed at 800° C. for 3 hours under protection of nitrogen to produce a monolithic carbon disk. The cyclic voltammetry of the carbon disk at a scan rate of 5 mV/s displayed the capacitance of the material at 90 F/gram. See FIG. 1.

Example 2

Synthesis of Polyimide Prepolymer with Three-Dimensional Molecular Structure Doped with 1% Molybdenum by Weight and Carbon Disk Therefrom Starting monomers and additive: 3,3'4,4'-biphenyltetraamine (TAB), 1,2,4,5-benzenetetracarboxylic dianhydride (PMDA), 1,4-phenylenediamine (PPD), and molybdenum chloride (V) ($MoCl_5$).

Solvent: N,N-dimethylacetamide (DMAc).

1.30 gram (0.012 mole) PPD and 0.135 gram $MoCl_5$ were dissolved in 40 ml DMAc in a flask. While stirring, 3.270 gram (0.015 mole) PMDA in the solid form was added to the reaction system. After PMDA was fully dissolved, 0.3215 gram (0.0015 mole) TAB was added to the reaction system. The reaction was carried out at ambient temperature with mechanical stirring until a very viscous solution, often gel lumps, was formed. The temperature of the reaction was gradually raised to 150° C. with strong agitation to produce polyimide/$MoCl_5$ in precipitated powder form. The solvent was distilled off under vacuum at 50° C. The powders were further broken down and filtered through a 50 micron-sized sieve.

The polyimide powder was compressed at 4500 psi pressure at ambient temperature to produce a monolithic disk. The monolithic disk was pyrolyzed at 800° C. for 3 hours under protection of nitrogen to produce a monolithic carbon disk. The cyclic voltammetry of the carbon disk at a scan rate of 5 mV/s displayed the capacitance of the material at 180 F/gram. See FIG. 2.

Example 3

Synthesis of Polyimide Prepolymer with Linear Molecular Structure Doped with 1% Molybdenum by Weight and Carbon Disk Therefrom Starting monomers and additive: 1,2,4,5-benzenetetracarboxylic dianhydride (PMDA), 1,4-phenylenediamine (PPD), and molybdenum chloride (V) ($MoCl_5$).

Solvent: N,N-dimethylacetamide (DMAc).

1.62 gram (0.015 mole) PPD and 0.135 gram $MoCl_5$ were dissolved in 40 ml DMAc in a flask. While stirring, 3.270 gram (0.015 mole) PMDA in the solid form was added to the reaction system. The reaction was carried out at ambient temperature with mechanical stirring until a very viscous solution is formed. The temperature of the reaction was gradually raised to 150° C. with strong agitation to produce polyimide/$MoCl_5$ in precipitated powder form. The solvent was distilled off under vacuum at 50° C. The powders were further broken down and filtered through a 50 micron-sized sieve.

The polyimide powder was compressed at 4500 psi pressure at ambient temperature to produce a monolithic disk. The monolithic disk was pyrolyzed at 800° C. for 3 hours under protection of nitrogen to produce a monolithic carbon disk. The cyclic voltammetry of the carbon disk at a scan rate of 5 mV/s displayed the capacitance of the material at 210 F/gram. See FIG. 3.

Example 4

Synthesis of Polyimide Prepolymer Doped with 1% (by wt.) Molybdenum in Acetone and Carbon Disk Therefrom Starting monomers and additive: 3,3'4,4'-biphenyltetraamine (TAB), 1,2,4,5-benzenetetracarboxylic dianhydride (PMDA), 1,4-phenylenediamine (PPD), and molybdenum chloride (V) ($MoCl_5$).

Solvent: acetone 3.270 gram (0.015 mole) PMDA was dissolved in 20 ml acetone. 1.30 gram (0.012 mole) PPD, 0.3215 gram (0.0015 mole) TAB, and 0.135 gram $MoCl_5$ were dissolved in 20 ml acetone in a separate flask. The PMDA solution was gradually added to PPD/TAB/$MoCl_5$ solution to produce a white precipitate immediately. The solvent was distilled off and temperature of the product was raised to 150° C. to convert poly(amic acids) to polyimide in powder form. The powders are further broken down and filtered through a 50 micron-sized sieve.

The polyimide powder was compressed at 4000 psi pressure at ambient temperature to produce a monolithic disk. The monolithic disk was pyrolyzed at 800° C. for 3 hours under protection of nitrogen to produce a monolithic carbon disk. The cyclic voltammetry of the carbon disk at a scan rate of 5 mV/s displayed the capacitance of the material at 100 F/gram.

Example 5

Synthesis of Polyimide Prepolymer with Three-Dimensional Molecular Structure Doped with 1% Molybdenum by Weight and Carbon Disk Therefrom Starting monomers and additive: 3,3'4,4'-biphenyltetraamine (TAB), 1,2,4,5-benzenetetracarboxylic dianhydride (PMDA), 1,4-phenylenediamine (PPD), diaminopyridine, and molybdenum chloride (V) ($MoCl_5$).

Solvent: N,N-dimethylacetamide (DMAc).

1.082 gram (0.01 mole) PPD, 0.218 gram diaminopyridine (0.002 mole) and 0.135 gram $MoCl_5$ were dissolved in 40 ml DMAc in a flask. While stirring, 3.270 gram (0.015 mole) PMDA in the solid form was added to the reaction system. After PMDA was fully dissolved, 0.3215 gram (0.0015 mole) TAB was added to the reaction system. The reaction was carried out at ambient temperature with a normal agitation until a viscous solution was formed. The temperature of the reaction was raised to 150° C. with strong agitation to produce polyimide/$MoCl_5$ in precipitated powder form. The solvent was distilled off under vacuum at 50° C. The powders were further broken down and filtered through a 50 micron-sized sieve.

The polyimide powder was compressed at 4000 psi pressure at ambient temperature to produce a monolithic disk. The monolithic disk was paralyzed at 800° C. for 3 hours under protection of nitrogen to produce a monolithic carbon disk. The cyclic voltammetry of the carbon disk at a scan rate of 5 mV/s displayed the capacitance of the material at 100 F/gram.

Thus, having described the invention, what is claimed is:

1. A process for producing monolithic porous carbon disks as electrode materials from prepolymers comprising either or both polyimide and polybenzimidazole in the powder form comprising the steps of:
   preparing prepolymer powders comprising either or both polyimide and polybenzimidazole;
   consolidating the unmelted prepolymer powders under pressure while maintaining the prepolymers in the powder state during the consolidating process to form a monolithic disk comprising pores; and
   pyrolyzing the consolidated disks in an inert atmosphere or carbon dioxide to form a monolithic porous carbon disk.

2. The process of claim 1 wherein a metallic compound is added to the prepolymer during any of the steps used to prepare the prepolymer powder or disks.

3. The process of claim 2 wherein the metallic compound contains metals selected from the group consisting of Ti, Zr, V, Nb, Cr, Mo, Mn, Fe, Ru, Co, Ni, Pd, Cu, Ag, Zn, Pb, Hf, W, Ba, Al, Pt, Si, P, Rh, Sb, Sn, Bi, and combinations thereof.

4. The process of claim 2 wherein the addition of a metallic compound or metallic compounds to the pre polymer is conducted to form a true molecular solution of the metallic compound with the prepolymer reaction system.

5. The process of claim 2 wherein the addition of a metallic compound or compounds to the prepolymer is conducted by adding a metallic compound solution to the dried prepolymer in either the powder form or consolidated disk followed by removing the solvent from the prepolymer.

6. The process of claim 2 wherein weight percentage of the metal in the carbon disk is in the range of 0.2% to 20%.

7. The process of claim 1 wherein the prepolymer is prepared as a powder precipitate in the presence of an organic solvent.

8. The process of claim 7 wherein the organic solvent is selected from N-methyl-2-pyrrolidinone (NMP), N,N-dimethylacetamide (DMAc), N,N-dimethyl formamide (DMF), tetrahydrofuran (THF), acetone, methanol, and tetrahydrofuran (THE), toluene, benzene, ethanol, 2-propanol, and mixtures thereof.

9. The process of claim 1 wherein the prepolymer powders for consolidation into a disk have the average particle size in the range of 1 µm to 200 µm.

10. The process of claim 1 wherein the prepolymer powder before consolidating into a disk is annealed at a temperature in the range of 150° C.-500° C.

11. The process of claim 1 wherein the prepolymer powders are consolidated under a pressure in the range of 500 psi to 10,000 psi.

12. The process of claim 1 wherein the monolithic carbon disk has a density in the range of 0.4 gram/cc to 1.2 gram/cc, and a surface area at or above 300 $m^2$/gram.

13. The process of claim 1 wherein an aromatic diamine monomer is used to form the polyimide segment of the prepolymer and is selected from 1,4-phenylenediamine; m-phenylenediamine, 4,4'diamino-biphenyl, 4,4'-diaminodiphenylmethane, 3,3'-diaminodiphenylmethane, 4,4'-diaminobenzophenone, 3,3'-diaminobenzophenone, 4,4'-diaminodiphenyl ether, benzidine, 2,6-diaminonaphthalene, 2,6-diaminopyridine, and derivatives thereof or a combination thereof.

14. The process of claim 1 wherein an aromatic dianhydride monomer is used to form the polyimide segment of the prepolymer and is selected from pyromellitic dianhydride, 3,3',4,4'-biphenyltetracarboxylic dianhydride, 3,3',4,4'-benzophenone tetracarboxylic dianhydride, 2,3,6,7-naphthylene tetracarboxylic dianhydride 1,4,5,8-naphthalene tetracarboxylic dianhydride, 2,2-bis(3,4-dicarboxyphenyl)propane dianhydride and combinations thereof.

15. The process of claim 1 wherein a monomer of ester (s) and acids of aromatic tetracarboxylic acids used to form the polyimide segment of the prepolymer is selected from the group consisting of pyrometallitic tetracarboxylic acids, 3,3', 4,4'-biphenyl tetracarboxylic acids, 3,3',4,4' benzophenone tetracarboxylic acids, 2,3,6,7 naphthalene tetracarboxylic acids, 1,4,5,8-naphthalene tetracarboxylic acids, and combinations thereof, including alkyl or phenyl esters, with the alkyl group containing 1-5 carbon atoms.

16. The process of claim 1 wherein a polyamine compound with amine functionality greater than 2 is used to from the polyimide segment of the prepolymer and is selected from 3,3'4,4'-biphenyltetraamine (TAB), 1,2,4,5-benzenetetraamine, 3,3'4,4'-tetraminodiphenyl ether, 3,3'4,4'-tetraminodiphenylmethane, 3,3',4,4'-tetraminobenzophenone, 3,3',4-triaminodipheny, I, 3,3',4-triaminodiphenylmethane, 3,3',4-triaminobenzophenone, 1,2,4-triaminobenzene, their mono-, di-, tri-, or tetra-acid salts, such as 3,3'4,4'-biphenyltetraamine tetrahydrochloride, 1,2,4,5-benzenetetraamine tetrahydrochloride, 3,3'4,4'-tetraminodiphenyl ether tetrahydrochloride, 3,3'4,4'-tetraminodiphenylmethane tetrahydrochloride, 3,3',4,4'-tetraminobenzophenone tetrahydrochloride, 3,3',4-triaminodiphenyl trihydrochloride, 3,3',4-triaminodiphenylmethane trihydrochloride, 3,3',4-triaminobenzophenone trihydrochloride, 1,2,4-triaminobenzene trihydrochloride, melamine, 2,4,6-triaminopyrimidine (TAP), or a polyamine oligomer with the formula:

17. The process of claim 1 wherein an aromatic isocyanate monomer is used to form the polyimide segment of the prepolymer and is selected from 1,3-phenylene diisocyanate, 1,4-phenylene diisocyanate and 4,4'-diphenylmethane diisocyanate.

18. The process of claim 1 wherein a monomer of ester(s) or acids of aromatic dicarboxylic acids is used to form the polybenzimidazole segment of the prepolymer is selected from esters and acids of isophthalic acid, phthalic acid, terephthalic acid, 1,4 naphthalene dicarboxylic acid or 2,6-napthalene dicarboxylic acid.

19. The process of claim 1 wherein an aromatic dialdehyde monomer is used to from the polybenzimidazole segment of the prepolymer and is selected from isophthalaldehyde, terephthaldicarboxaldehyde, phthalic dicarboxaldehyde, and 2,6-naphthalenedicarboxaldehyde, and combinations thereof.

20. The process of claim 1 wherein an aromatic tetraamines monomer is used to form the polybenzimidazole segment of the prepolymer and is selected from 3,3',4,4'-tetraaminobiphenyl(3,3'-diaminobenzidine); 1,2,4,5-tetraminobenzene; 1,2,5,6-tetraminonaphthalene; 2,3,6,7-tetraminonaphthalene; 3,3',4,4'-tetraminodiphenyl methane; 3,3',4,4'-tetraminodiphenyl ethane; 3,3',4,4'-tetraminodiphenyl-2,2-propane; and combinations thereof.

21. The process of claim 1 wherein said polyimide and polybenzimidazole have structures of the formulas:

Polyimide

Polybenzimidazole wherein A1 and A4 represent phenyl, biphenyl, an optionally substituted aryl, optionally substituted alkylene, an optionally substituted heteroaryl, or a combination thereof wherein A2 and A5 represents phenyl, biphenyl, an optionally substituted aryl group, or an optionally substituted heteroaryl group; wherein A3 represent multifunctional phenyl with functionality more than or equal to 2, multifunctional biphenyl with functionality more than or equal to 2, an optionally substituted multifunctional aryl with functionality more than or equal to 2, optionally substituted multifunctional alkylene with functionality more than or equal to 2, an optionally substituted multifunctional heteroaryl with functionality more than or equal to 2, or a combination thereof; n1, n2 and n3 are greater or equal to 1; and (y+2) are more than or equal to 2.

22. The process of claim 1 in which the process further comprises incorporating reinforcing materials or other additives in solid form with prepolymer powders during the consolidation process to produce the monolithic porous carbon disks therefrom.

23. The process of claim 22 wherein the reinforcing materials or other additives include reinforcement fiber pad in the form of either a non-woven or woven form composed of one or more than one kinds of an organic polymer fiber or inorganic polymer fiber or metal fibers, carbon cloth, carbon paper, carbon nanotubes, metallic fibers or particles, polymeric micron beads, microcrystalline inorganic and organic compounds, silica powder, inorganic fillers, or particles.

* * * * *